United States Patent
Derderian et al.

[11] 3,991,486
[45] Nov. 16, 1976

[54] AIRCRAFT LANDING SIGNAL OFFICER TRAINER

[75] Inventors: George Derderian; Alfred H. Rodemann, both of Maitland; Windell N. Mohon; John W. Pease, both of Winter Park, all of Fla.

[73] Assignee: The United States of America as represented by the Secretary of the Navy, Washington, D.C.

[22] Filed: Nov. 7, 1975

[21] Appl. No.: 630,126

[52] U.S. Cl. .................................. 35/12 N; 350/3.5
[51] Int. Cl.² ............................................ G09B 9/00
[58] Field of Search ......................... 35/12 N, 10.2; 178/DIG. 35, 6; 350/3.5

[56] References Cited
UNITED STATES PATENTS

| | | | |
|---|---|---|---|
| 3,583,784 | 6/1971 | Hanna.............................. | 35/12 N X |
| 3,600,055 | 8/1971 | Emerick.......................... | 35/12 N X |
| 3,619,026 | 11/1971 | Cindrich ......................... | 35/12 N X |
| 3,632,181 | 1/1972 | Lee ...................................... | 350/3.5 |
| 3,761,156 | 9/1973 | Mohon et al. .................. | 35/12 N X |
| 3,774,990 | 11/1973 | Beck et al...................... | 35/12 N X |
| 3,832,046 | 8/1974 | Mecklenborg................... | 35/12 N X |

*Primary Examiner*—Anton O. Dechsle
*Assistant Examiner*—Vance Y. Hum
*Attorney, Agent, or Firm*—Richard S. Sciascia; John W. Pease

[57] ABSTRACT

A landing signal officer trainer having a cylindrically rolled holographic film with stored attitude data of yaw and pitch rotatably and slidably mounted in conjunction and relation to a laser beam source to vary yaw and pitch image attitude of a plane, a pechan prism rotatable to vary roll of the plane image, a zoom lens system to vary range of the plane image, enlarging lens apparatus to present an adequate image to a landing signal officer (LSO) observing the image, and a control panel operable by an instructor to vary the plane attitude and range position in accordance to the signals given by the trainee and thus provide unprogrammed training in guiding landing aircraft without use of actual equipment and in a manner in which the trainee participates. The invention further contemplates the provision of a ship holographic image variable in pitch and control apparatus for selectively coordinating plane range and ship pitch to produce land or abort conditions.

7 Claims, 5 Drawing Figures

AIRCRAFT LANDING SIGNAL OFFICER TRAINER

BACKGROUND OF THE INVENTION

The invention relates to the fields of simulation and holography and in particular to a trainer capable of presenting 360° holographic views of an aircraft and of varying the attitude of the plane in yaw, pitch and roll, as well as varying the range position of the plane.

In the landing of aircraft on a carrier it is the function of the landing signal officer (LSO) to observe the plane attitude at various range positions thereof and judge its speed in relation to attitude, angle of attack, altitude, rate of descent, and in conjunction therewith, the motion of the ship in rise and fall to either talk the pilot into a satisfactory landing or to signal a required abort.

In the past the LSO was given on-the-job training with operational equipment. This approach was unsatisfactory because of the limited amount of operational time available. Training was also given by movies of other LSO's in action. This approach also was not satisfactory because the trainee LSO was not a participant in the training and therefore did not learn from his mistakes.

SUMMARY OF THE INVENTION

In accordance with the invention the necessary real time effort and realism for full time training is provided by a simulator trainer in which, through manipulation of a 360° holographic film, a pechan prism and a zoom lens range device in combination with a set of enlarging lenses the LSO is given a three dimensional view of any aspect and angle and distance of an aircraft supposedly landing on a carrier deck. Further, through the provision of an instructor control panel manually operable by the instructor to move the film, prism and lenses in a manner to control yaw, pitch, roll and range of the plane, the instructor is able to watch the trainee and the plane image and adjust the plane conditions to provide a problem or to change its aspects in accordance with the responces of the trainee. The trainee is provided with the normal operational mike which the LSO uses and on which are positioned one button to press to condition the mike to talk to the pilot and a second button to press to activate the abort red lights which are part of the landing lights monitored by the plane pilot as he lands under the present FLOLS (Fresnel Lens Optical Landing System.)

DESCRIPTION OF THE PREFERRED EMBODIMENT

The landing signal officer (LSO) trainer which is the subject of this invention provides an unprogrammed, three hundred and sixty degree view of an aircraft and means for changing the attitude and range of the aircraft as it approaches a carrier deck for landing. The trainer also provides a holographic display of the carrier deck and means for varying the pitch of the deck in coordination with range control to further augment the training of the LSO and provide maximum realism in training.

In actual operations the LSO observes the incoming plane to ascertain whether or not the pilot has correct altitude, plane attitude and speed, and also looks back along the carrier deck to ascertain the ship pitch motions such that the plane will land as the flight deck entry is on a down pitch. The LSO is provided with a mike for talking to the pilot to aid his landing and an abort button on the mike for activating abort lights when abort action is necessary.

Figure 5:
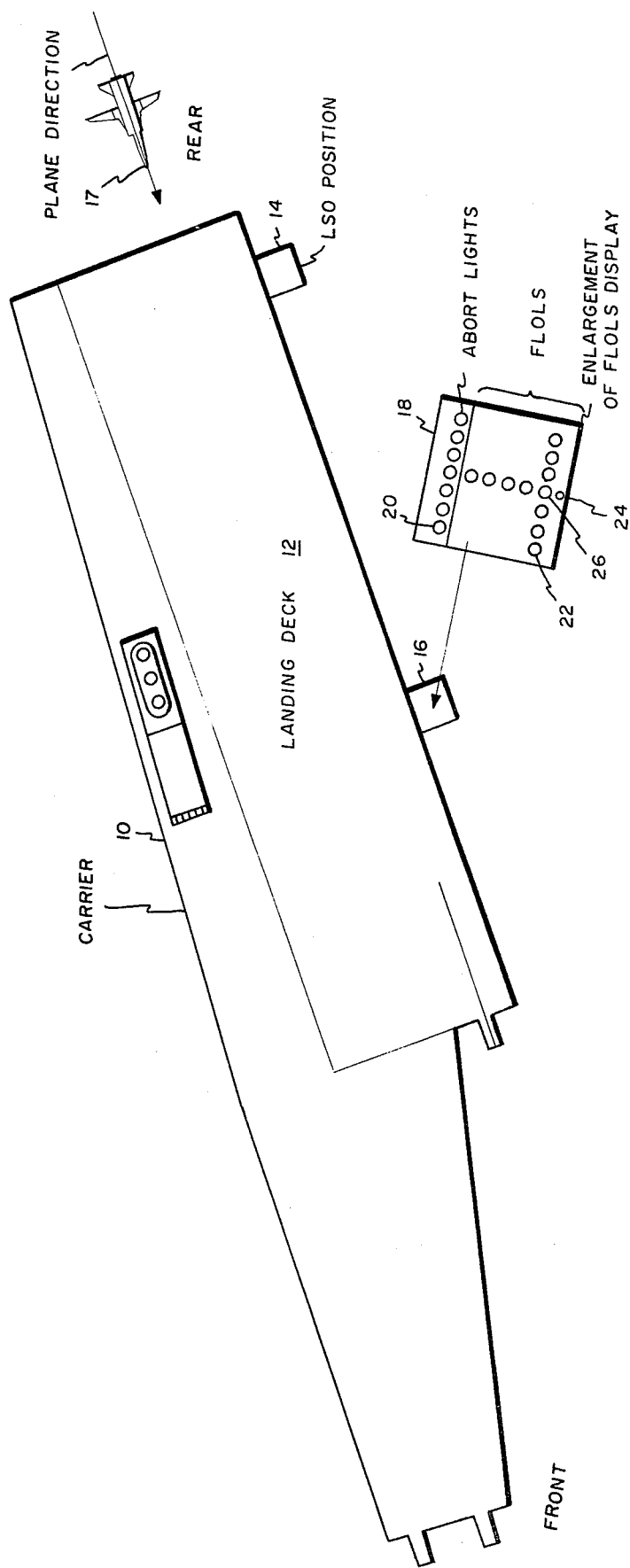
FIG. 5 is a plan view of a carrier deck and landing strip showing the positions of the LSO and the FLOLS system, and an enlarged view of the FLOLS system display panel.

FIG. 5 is provided to illustrate the environment of LSO operation. The carrier is indicated at 10, the landing deck at 12, the LSO position at 14, the FLOLS display position at 16, and the direction of plane landing by arrow 17. At 18 is shown an enlargement of the FLOLS system light display panel, including a row of horizontal abort lights 20, a row of reference line lights 22, a vertical row of angle of approach correction lights 24, including one light 26 which indicates a perfect on course condition. The FLOLS light display is mounted on a stable platform (not shown) such that the pitch or roll of the ship has no effect of diverting the display from the view of the pilot.

Figure 1:
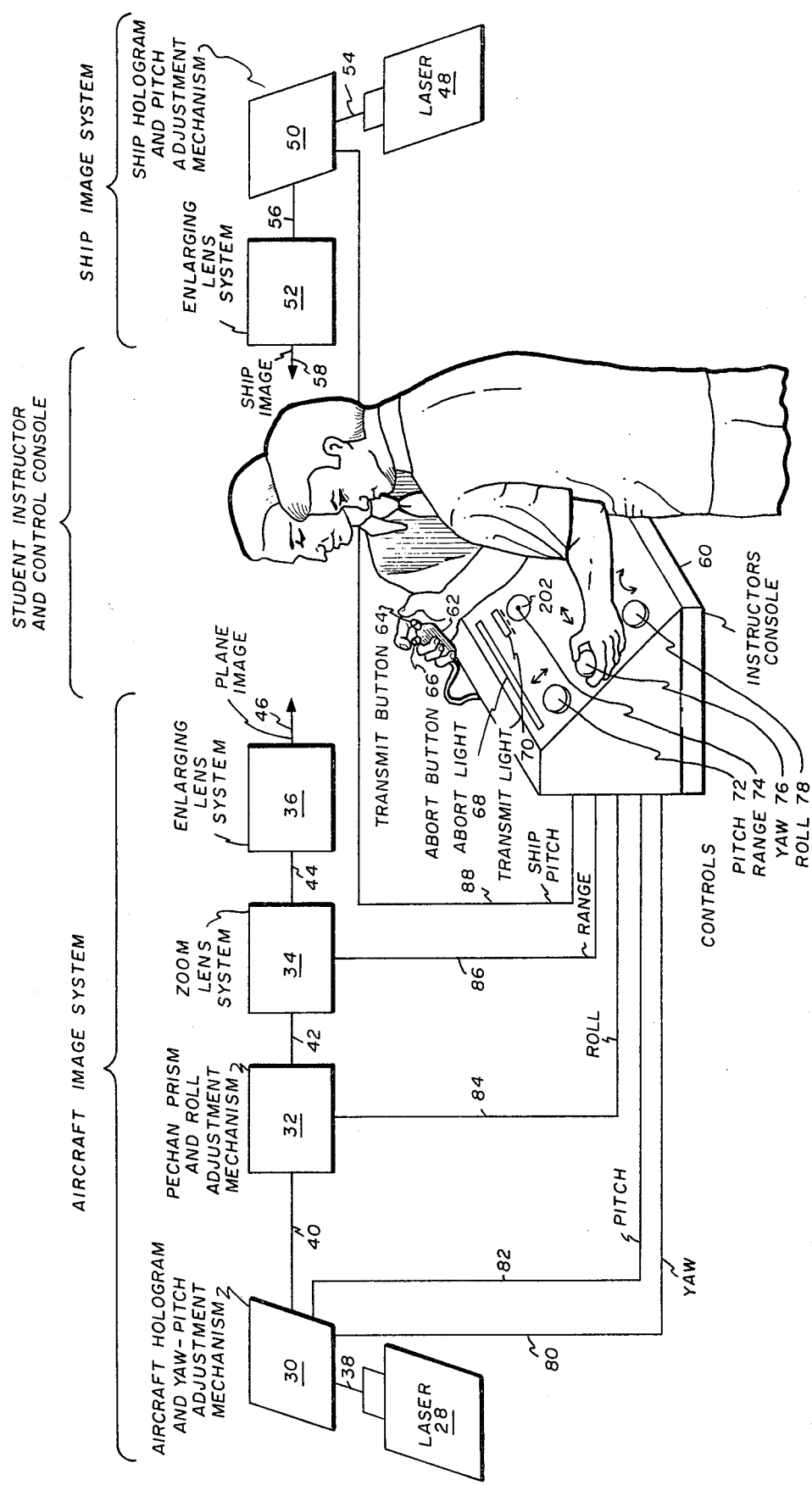
FIG. 1 is a block diagram and perspective view of an LSO trainer incorporating the invention.

Having the above in mind, reference is made to the diagrammatic block diagram of FIG. 1, which shows one complete holographic LSO trainer system incorporating applicants' invention. Briefly, the system includes an aircraft image system portion, a student, instructor and control console, and a ship image system all indicated by bracketing labels.

In FIG. 1, the aircraft image portion of the system includes a laser beam source 28, a holographic film and adjusting mechanism 30 for providing 360° plane (aircraft) images of changes in yaw and pitch attitude, a pechan prism 32 rotatably mounted to produce 360° roll in the plane image, an adjustable zoom lens system 34 for adjusting range of the plane image and a set of enlarging lenses 36 for enlarging the plane image for direct eye viewing. The laser beam follows a path indicated by the lines 38, 40, 42 and 44 to emerge as an image on optical axis 46 of the subject trainer for the viewing thereof by one or more observers.

The ship image system portion of the overall system (FIG. 1) includes a second laser source 48, a ship hologram with stored data of various attitudes of pitch and adjusting mechanism to selectively produce variation of pitch, all indicated by block 50 and again an enlarging lens system 52 for viewing the ship image 58. The laser beam from laser 48 follows the path indicated by lines 54 and 56 to emerge as an image as indicated by arrow 58.

Figure 2:
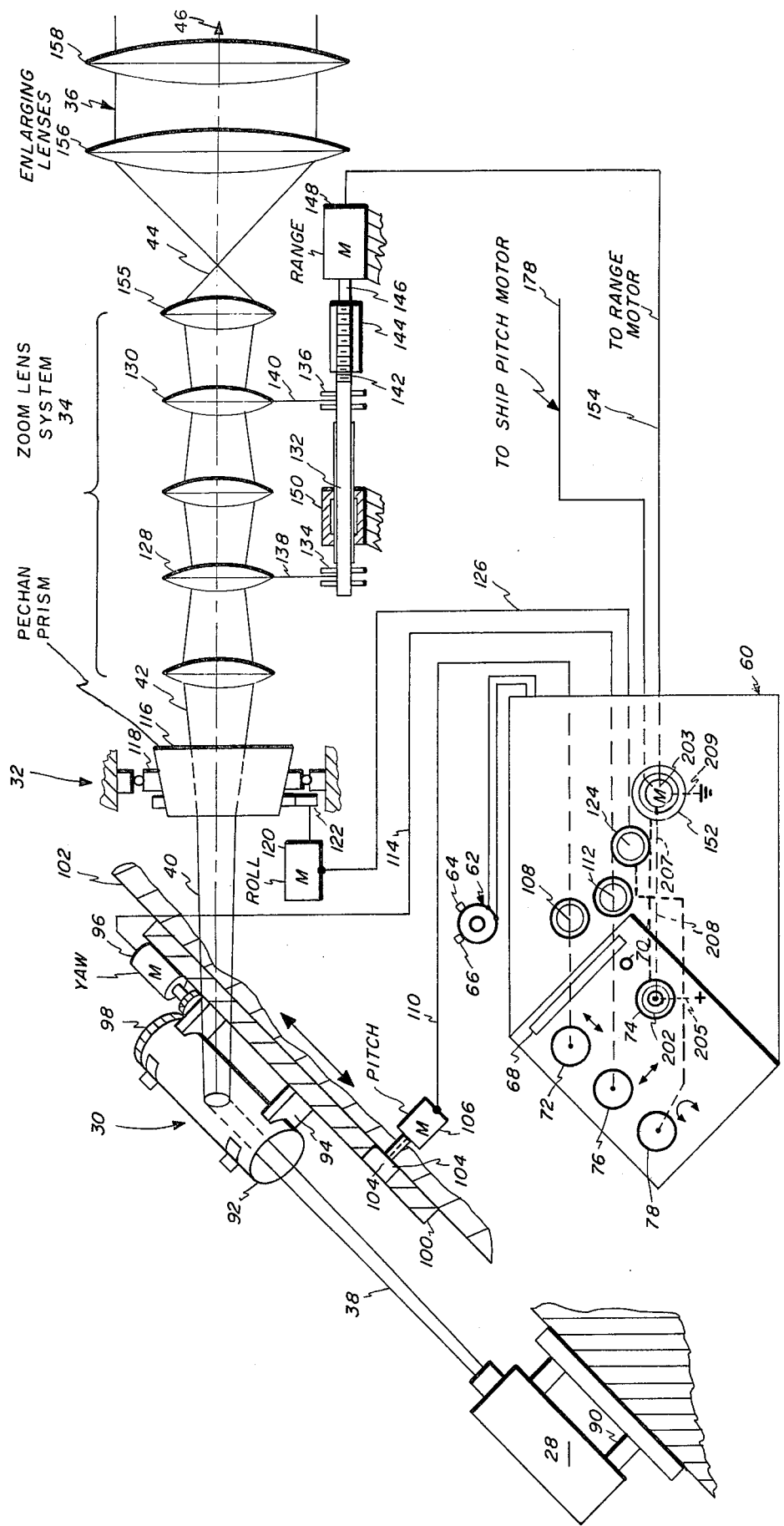
FIG. 2 is a schematic view of an aircraft image-producing portion of FIG. 1 giving details of means for adjustment of image for attitude and range of the aircraft.
Figure 3:
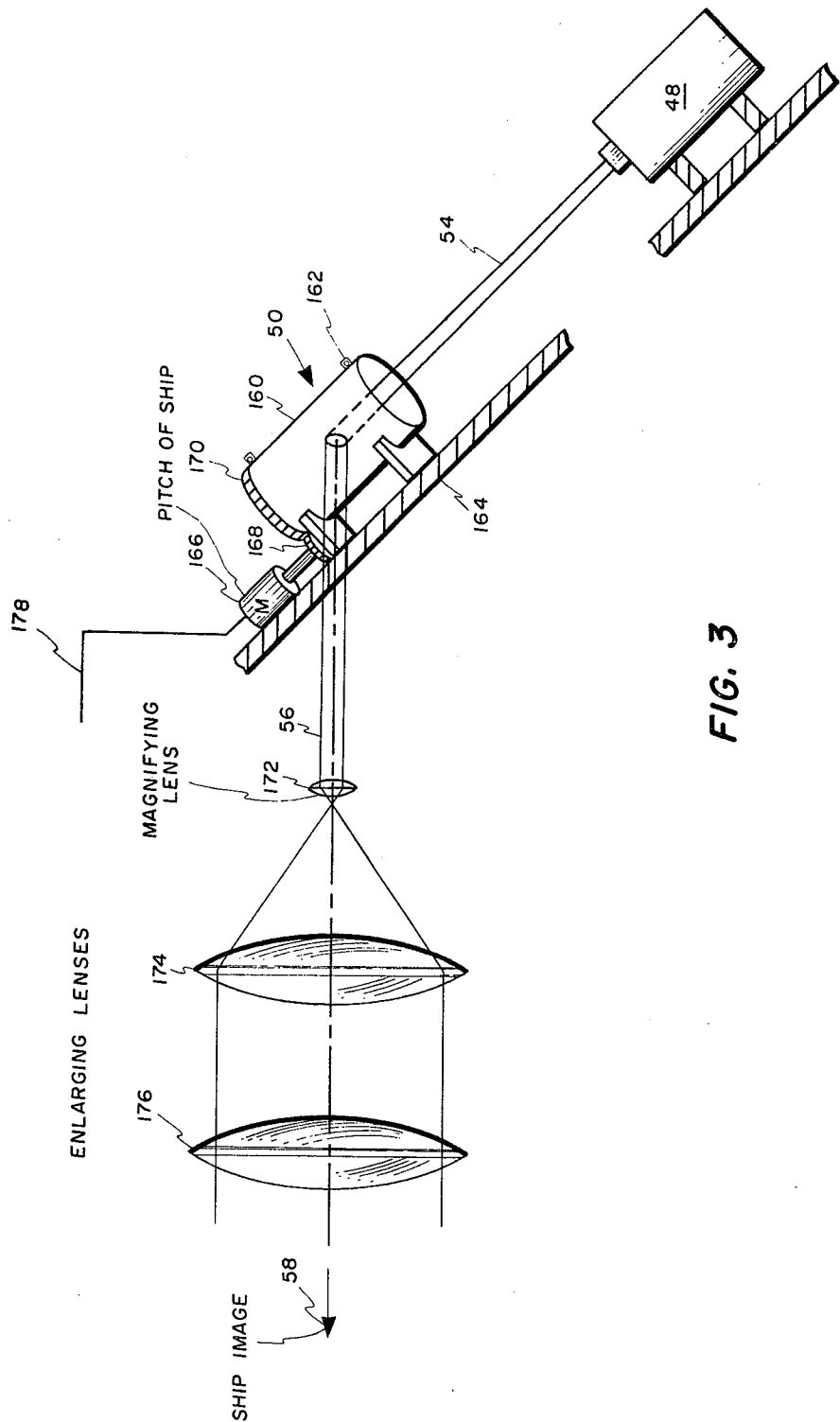
FIG. 3 is a schematic view of a ship image producing portion of FIG. 1 giving details of means for adjusting ship pitch attitude.
Figure 4:
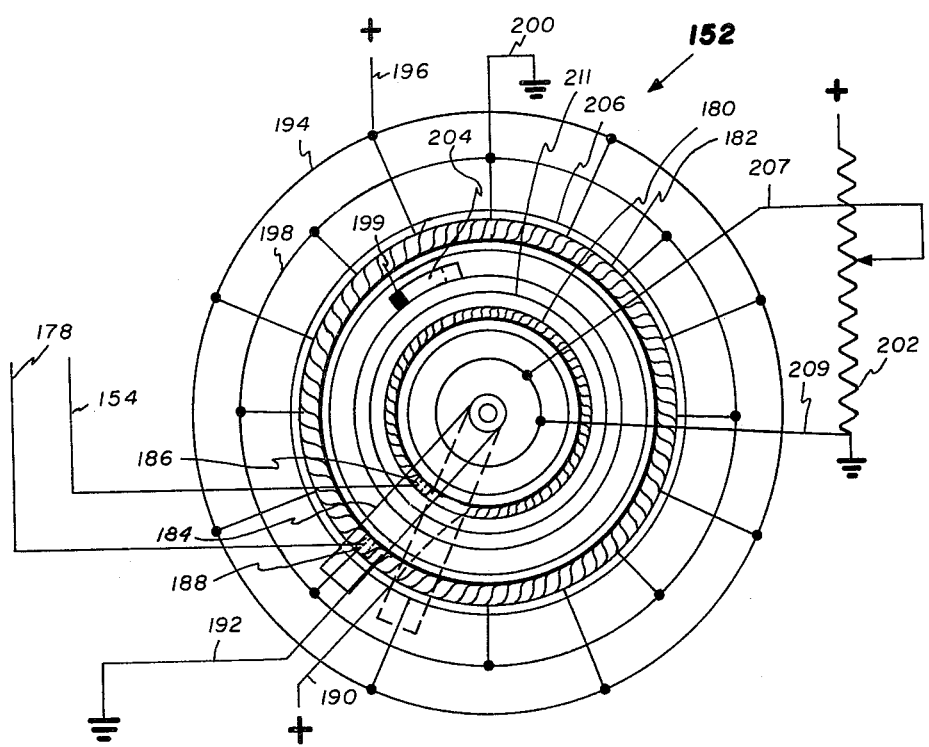
FIG. 4 is a plan view of a motorized rheostat control for operating a range drive motor shown in FIG. 2 and a ship pitch motor shown in FIG. 3, and provided to show the coordination of plane range and ship pitch commensurate with land or abort conditions at the selection of the instructor.

The student-instructor-control console portion of the system includes an instructor's console panel 60 and a microphone 62 with a voice transmit button 64 and an abort button 66, commonly called a "pickle" because of its shape. The instructor's console is provided with an abort light 68 and a transmit light 70 operable respectively by the abort and transmit buttons 66 and 64 on the student control mike 62. The instructor's console is provided with manual controls of pitch 72, range 74, yaw 76, and roll 78. The control electrical signals developed in the instructor's control panel, as will be described in detail in reference to FIGS. 2, 3 and 4, are passed to hologram mechanism 30 on lines 80 and 82 in the form of yaw and pitch signals to orient the plane image in relation to desired yaw and pitch; to the pechan prism mechanism 32 in a roll signal on line 84 to orient the plane image in relation to selected roll; and to zoom lens system 34 in the form of a range signal on line 86 to selectively determine the plane image range. The pitch or the ship image is determined by a pitch signal on line 88 connected to the mechanism in block 50 which controls ship pitch.

FIG. 2 illustrates in simplified form one suitable arrangement for the aircraft image system of FIG. 1. In FIG. 2, the laser 28 mounted in fixed position on mount 90, indicated, passes its beam 38 to a rolled hologram 92 rotatably mounted as at bearing mounts 94 and driven by a yaw servo motor 96 geared as at 98 to the cylindrical holographic film 92. A slidable gear rack base 100 slidably supports the film cylinder 92 for linear fore and aft movement on a base indicated at 102, the rack base 100 being driven by the output gear 104 of a drive pitch motor 106. The pitch motor 106 is driven via a manual rheostat 108 from the control 72 and passes its activating electrical signal on a line 110 to motor 106. The yaw control motor 96 is controlled via a rheostat 112 connected as indicated to manual control 76 and passes its electrical control voltage signal via line 114 to motor 96.

The output image carrying laser beam 40 is passed to a pechan prism 116 rotatably mounted on bearing 118. The prism is rotated by servo motor 120 via drive wheel 122 or other suitable means. The servo motor is operated by voltage from a rheostat 124 via line 126, the rheostat being connected as indicated by dotted lines to the manual roll control knob 78. Thereafter, the image carrying laser beam 42 passes to the zoom lens system 34 in which two moveable lenses 128 and 130 are slidably moved in unison by the carry bar 132 of range adjusting mechanism. The bar has spaced captive guides 134 and 136 for moving connectors 138 and 140 connected respectively to the lenses 128 and 130. The rod 132 is formed with a male thread 142 threaded into an internally threaded enlarged coupling 144 fixed to the shaft 146 of a fixed position range servo motor 148. The carry bar 132 is spline fitted as indicated in a fixed block 150 for slidable movement of the bar responsive to rotation of the shaft 146 of motor 148 to thereby reciprocally adjust the lenses 128 and 130. The range servo motor 148 is controlled from a motorized rheostat 152 connected to a manual rheostat motor control actuator 202 as indicated to send a voltage control signal on electric line 154 to range motor 148. Details of the motorized rheostat 152 and its selective use application will be described hereinafter in relation to FIG. 4. Continuing with the aircraft image system, the output beam 44 of the zoom lens system is passed to an enlarging lens system 36 indicated by lenses 155, 156 and 158 for view of the image indicated by arrow 46.

Details of the ship image system are shown in FIG. 3 wherein a laser 48 passes a laser beam 54 to a fixed position in relation to a cylindrical hologram 160 in which are stored various attitudes of pitch of a ship. The attitudes are variable by rolling the hologram 160 on bearings 162 supported on a fixed support 164. The hologram is driven by a pitch servo motor 166 and a drive mechanism exemplified by gears 168 – 170. The output beam 56 from the hologram carries an image which is enlarged by enlarging lenses 172, 174, 176 to provide a ship image indicated by arrow 58.

As hereinbefore mentioned, the LSO must coordinate the ship pitch with plane range to assure that the ship landing deck end is on the beginning of a down pitch at the time the plane sets down. An upswing of the deck could cause the plane to crash into the ship. With this in mind, it will be noted (FIG. 2) that the motorized rheostat 152 has two outputs, line 154 to the range motor 148 and line 178 to ship pitch motor 166. Referring to FIG. 4 the rheostat 152 comprises two resistors 180 and 182 and a wiper arm 184 which has one wiper 186 contacting resistor 180 and a second wiper 188 contacting rheostat 182. Wiper 186 is connected by line 154 to the plane range motor 148 and wiper 188 is connected by line 178 to ship pitch motor 166. Resistor 180 is connected by line 190 to a positive power source indicated and by line 192 to a ground, indicated, such that clockwise rotation of arm 184 and its wiper 186 provide voltage of increasing value on line 154 to gradually decrease the plane range distance via action of the range motor 148. Resistor 182 is connected at spaced intervals via a circular conductor line 194 and line 196 to a positive voltage source, indicated, and is connected at intermediate points on the same resistor via a circular conductor 198 and line 200 to a ground, indicated. By this arrangement as the arm 184 is rotated clockwise the voltage power to pitch motor 166 via line 178 starts with a zero value and successively increases and decreases in value causing the motor 166 to roll the hologram cylinder in one direction and then the other to develop an image of rise and fall of the flight entry end of the ship.

In this setting of the resistors as described above, when the arm 184 is at the end of its travel, indicated by its dotted line position, high voltage is being applied to the ship pitch motor 166 and the ship image indicates the condition of the ship bow just beginning to rise. This is the condition for safe landing and the LSO allows the plane to land.

As indicated in FIG. 2, the instructor can adjust a manual rheostat indicated at 202 to adjust power supplied to the rheostat motor 203 via the dotted lines 205, 207 and 209 connected between the positive source and ground indicated. However, he can also rotate the knob 74 (FIG. 2) to index the outer resistor 182 (FIG. 4) one step out of its present relation to inner resistor 180. The indexing slot is shown at 204. The connection between the knob 74 and the base 206 (FIG. 2) is indicated by dotted line 208. The base (FIG. 4) 206 is rotatable on a base 211 on which the inner resistor 180 is mounted. When the indexing detent 199 is to the right of the indexing slot 204 the relationship of range and ship pitch is changed such that at the end of the range distance decrease (when the plane is in position to land), the ship is on the bottom of a pitch and beginning an up pitch. This is the wrong condition for landing a plane and the LSO is expected to press his abort button 66 to light the red abort light portion 68 (FIG. 1) of the instructor's panel. Thus, the instructor can provide unprogrammed changes in plane attitude and range and also in ship attitude to test and train the LSO.

It will be understood that various changes in the details, materials, and arrangements of parts (and steps), which have been herein described and illustrated in order to explain the nature of the invention, may be made by those skilled in the art within the principle and scope of the invention as expressed in the appended claims.

What is claimed is:

1. An aircraft landing signal officer trainer, comprising in combination:
   a holographic film having a diffraction grating therein which defines a three-dimensional image of an aircraft, said holographic film being cylindrical in geometrical configuration, having at least one open end, and being rotatable about the axis of revolution thereof;
   a laser for producing and projecting a continuous laser beam, said laser being spatially disposed from said cylindrical holographic film in such manner as to project the laser beam produced thereby through the open end thereof and to and through the diffraction grating therein, so as to illuminate a predetermined portion thereof and, hence, cause an image of said aircraft at a certain apparent pitch and yaw attitude to be projected therefrom along a predetermined optical axis;
   a first platform;
   bearing means connected between said first platform and the aforesaid cylindrical holographic film for the mounting thereof thereon in such manner as to permit said cylindrical holographic film to be rotated about the axis of revolution thereof;
   first drive means effectively connected between said first platform and said cylindrical holographic film for timely effecting the rotation thereof about its axis of revolution and, hence, for causing the moving thereof in such manner with respect to said laser beam as to change the apparent yaw of the aircraft image projected along the aforesaid predetermined optical axis;
   a second platform slidably supporting the aforesaid first platform in such manner that said cylindrical holographic film effectively mounted thereon may be moved back and forth along the axis of revolution thereof;
   second drive means connected between said second and first platforms for timely effecting slidable relative movement therebetween and, hence, for causing said cylindrical holographic film to be moved in such manner with respect to said laser beam as to change the apparent pitch of the aircraft image projected along the aforesaid predetermined optical axis;
   a rotatable pechan prism spatially disposed from said cylindrical holographic film in the path of the aforesaid aircraft image projected therefrom along said predetermined optical axis;
   a third drive means effectively connected to said rotatable pechan prism for effecting the rotation thereof in such manner as to change the apparent roll of the aircraft image passing therethrough;
   adjustable zoom lens means spatially disposed from said rotatable pechan prism and on the aforesaid predetermined optical axis;
   a fourth drive means effectively connected to said zoom lens means for effecting the adjusting thereof in such manner as to vary the size of the aircraft image passing therethrough and, hence, for effecting an apparent change in the range of the image of the aircraft being projected along the aforesaid predetermined optical axis; and
   means spatially disposed from said zoom lens means and on the aforesaid predetermined optical axis for magnifying the aircraft image received therefrom.

2. The device of claim 1, wherein said first drive means comprises:
   a reversible first motor mounted on said first platform, said first motor having a rotatable drive shaft;
   a first gear connected to the drive shaft of said first motor;
   a second gear connected to the end of said holographic film that is opposite the end thereof through which the aforesaid laser beam is projected and in such manner as to effect the rotation thereof about the axis of revolution thereof, with said second gear being in such engagement with said first gear in such manner as to be timely driven thereby.

3. The device of claim 1, wherein said second drive means comprises:
   a rack base connected to said first platform in such manner as to be in parallel with the axis of revolution of the aforesaid holographic film;
   a reversible second motor effectively connected to said second platform, said second motor having a drive shaft; and
   a gear connected to the drive shaft of said second motor and engaged with the rack base of said first platform for the timely driving thereof, thereby causing said first platform to be slidably moved with respect to said second platform in such manner that said cylindrical holographic film is effectively moved back and forth along the axis of revolution thereof.

4. The device of claim 1, wherein said adjustable zoom lens means comprises:
   a first lens effectively mounted from disposition on said predetermined optical axis;
   a second lens effectively mounted for spatial disposition from said first lens on said predetermined optical axis;
   a third lens effectively movably mounted between said first and second lenses on said predetermined optical axis;
   a fourth lens effectively movably mounted for spatial disposition from said second lens on said predetermined optical axis on the side of said second lens that is opposite the aforesaid third lens; and
   means connected to said second and fourth lenses for effecting the simultaneous movement thereof back and forth along said predetermined optical axis.

5. The invention of claim 1, further characterized by:
   an instructor's console;
   means mounted on said instructor's control console and respectively connected to the aforesaid first, second, third, and fourth drive means for timely adjustment thereof by an instructor, so as to permit his modifying the apparent yaw, pitch, roll, and range of said aircraft image in such manner as to vary the apparent attitude and position thereof in response to the signals received from an aircraft landing signal officer trainee.

6. The invention of claim 1, further characterized by:

a second holographic film having a diffraction grating therein which defines a three-dimensional image of an aircraft carrier, said second holographic film being cylindrical in geometrical configuration, having at least one open end, and being rotatable about the axis of revolution thereof;

a second laser for projecting a second continuous laser beam, said second laser being spatially disposed from said second cylindrical holographic film in such manner as to project the second laser beam produced thereby through the open end thereof and to and through the diffraction grating therein, so as to illuminate a predetermined portion thereof and, hence, cause an image of said aircraft carrier at a certain apparent pitch attitude to be projected therefrom along a second predetermined optical axis;

a third platform;

bearing means connected between said third platform and the aforesaid second cylindrical holographic film for the mounting thereof thereon in such manner as to permit said second holographic film to be rotated about the axis of revolution thereof;

fifth drive means effectively connected between said third platform and said second cylindrical holographic film for timely effecting the rotation thereof about its axis of revolution and, hence, for causing the moving thereof in such manner with respect to said second laser beam as to change the apparent pitch of the aircraft carrier image projected along the aforesaid second predetermined optical axis;

means spatially disposed from said second holographic film and on said second predetermined optical axis for enlarging the aircraft carrier image projected therealong; and means connected to said fourth and fifth drive means for respectively and selectively controlling, and thus coordinating, the aforesaid apparent range of said aircraft image with respect to the apparent pitch of said aircraft carrier image.

7. The device of claim 6, wherein said means connected to said fourth and fifth drive means for respectively and selectively controlling, and thus coordinating, the aforesaid apparent range of said aircraft image with respect to the apparent pitch of said aircraft carrier image comprises:

double concentric rheostats and a single sweep arm with double in line wipe elements contacting respectively said concentric rheostats to provide outputs therefrom;

with one of said rheostats being adapted for controlling apparent aircraft range by having one end thereof connected to a positive voltage source and the other end thereof connected to a ground;

with the other of said rheostats being adapted for controlling apparent aircraft carrier pitch by having spaced points thereon connected to a positive voltage source and midway spots between said spaced points connected to a ground; and relatively rotatable mounting means for said rheostats having indexing limitation mechanism for selectively varying the respective positions thereof to provide an upswing or downswing apparent aircraft carrier pitch condition position on said apparent aircraft carrier pitch rheostat as desired corresponding to a landing condition position on said apparent aircraft range condition rheostat.

* * * * *